UNITED STATES PATENT OFFICE.

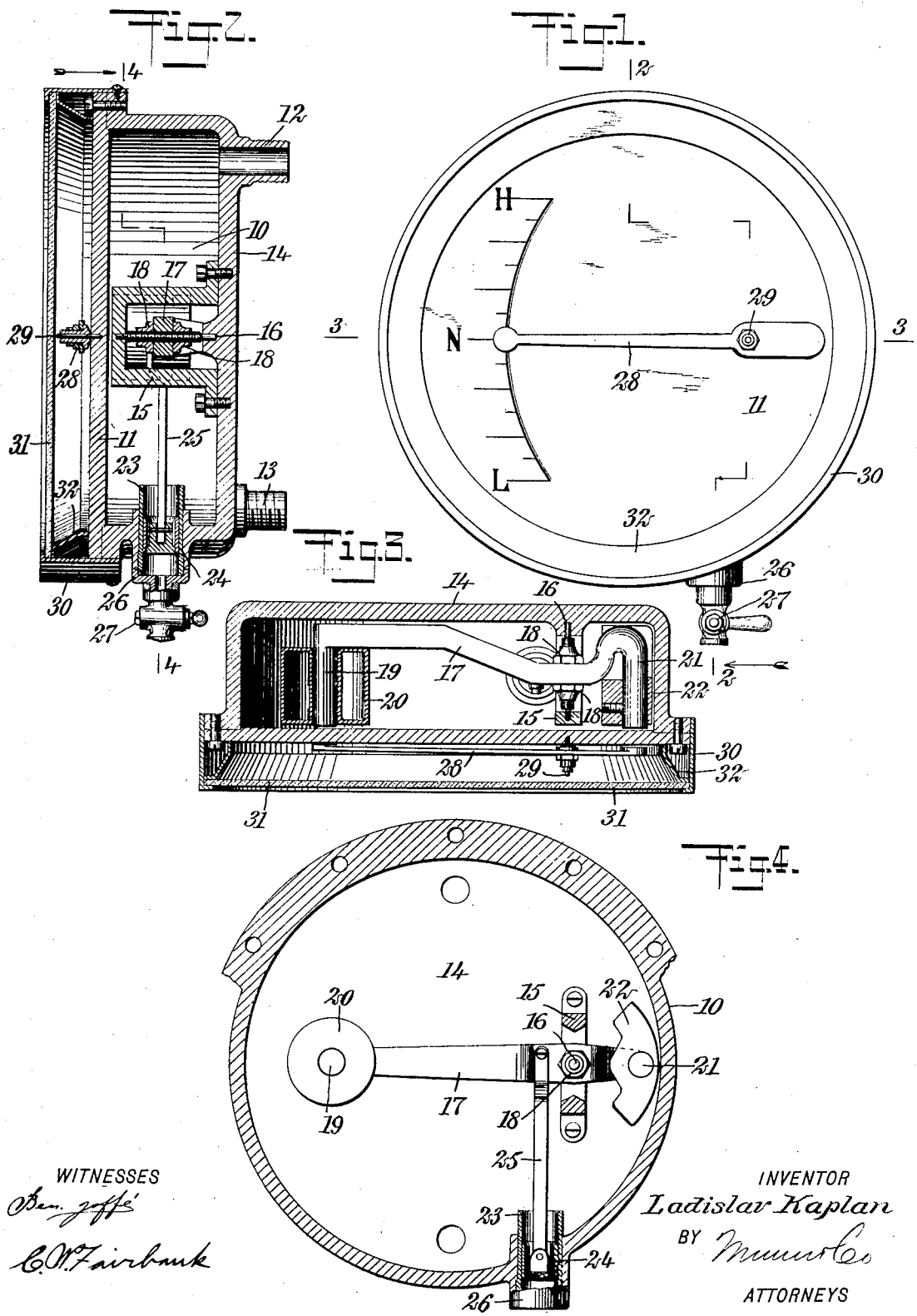

LADISLAV KAPLAN, OF CLINTON, CONNECTICUT, ASSIGNOR OF ONE-HALF TO OTTO J. MULLER, OF NEW YORK, N. Y.

WATER-GAGE.

No. 916,166.  Specification of Letters Patent.  Patented March 23, 1909.

Application filed April 14, 1908. Serial No. 426,930.

*To all whom it may concern:*

Be it known that I, LADISLAV KAPLAN, a citizen of the United States, and a resident of Clinton, in the county of Middlesex and State of Connecticut, have invented a new and Improved Water-Gage, of which the following is a full, clear, and exact description.

This invention relates to certain improvements in water gages, and more particularly to that type of gage in which a movable magnet is employed, the position of the magnet depending upon the height of the water in the boiler or other container. In this type the indicator or pointer is mounted outside of the compartment in which the magnet is mounted, and the movement of the indicator or pointer is controlled by the movement of the magnet which is on the opposite side of an impervious wall or diaphragm.

One special object of my invention is to provide an improved form of magnet, having the float and weight carried thereby so disposed as to reduce the strain upon the pivot of the magnet and permit a free movement.

A further object of the invention is to provide a controller for the magnet, so designed as to prevent rapid movement of said magnet during rapid variations in the water level.

Reference is to be had to the accompanying drawings, forming a part of this specification, in which similar characters of reference indicate corresponding parts in all the figures, and in which—

Figure 1 is a face view of a water gage constructed in accordance with my invention; Fig. 2 is a section on the line 2—2 of Fig. 1; Fig. 3 is a transverse section on the line 3—3 of Fig. 1; and Fig. 4 is a section on the line 4—4 of Fig. 2.

In the specific form of my gage illustrated in the accompanying drawings, I provide a casing 10, having a water-tight cover 11, and provided with means for connecting the upper and lower portions of the container with a steam boiler, or any tank, vessel, or chamber containing a liquid the level of which it is desired to indicate. As shown, the casing carries two threaded nipples 12 and 13, at its rear side and adjacent the top and bottom. The back wall 14 of the casing carries a bracket 15, serving as a support for one end of a pivot pin 16, the opposite end of said pin being inserted within an opening in the back wall. The bracket is preferably secured to the back wall by suitable screws, and while in place the pivot pin is positively held against longitudinal movement or accidental displacement. The pivot pin is threaded intermediate its ends, and serves to support a magnet 17, the latter being held from movement along the pivot pin by suitable nuts 18, threaded on the pivot pin and engaging with the opposite sides of the magnet.

The magnet is clamped to the pivot pin equi-distant from the ends of the latter, and the magnet is so formed that the weight will be borne equally by the two ends of the pivot pin. The magnet at each side of the pivot is bent toward the rear wall 14 and the opposite terminal portions of the magnet are bent outwardly at right angles to the rear wall and substantially parallel to the pivot pin. One of these terminal portions 19, is extended through a central aperture in an annular float 20, while the opposite terminal portion 21 is extended through an aperture in a counterbalancing weight 22. The weight and float are upon opposite sides of the pivot pin, and by reason of the particular form of the magnet, they each extend along the length of the pivot pin, so that a portion of each comes upon opposite sides of the center of said pin and the two ends of the pivot pin bear equal amounts of the load.

To prevent rapid oscillation of the magnet during rapid variations in the liquid level, I provide a controller in the form of a small pump or dash-pot. At the lower portion of the casing, I mount a cylinder 23, and within the cylinder I provide a piston 24, the piston rod 25 of which is extended upwardly and connected to the magnet adjacent the pivot pin 16. The piston so fits the cylinder that liquid can escape past it very slowly, and the piston thus serves as a controller or brake for the magnet. As the water in the container suddenly lowers, the piston and piston rod support the magnet until the water beneath the piston has had time to slowly escape past the piston into the container. Likewise, should the level of the water suddenly rise, the piston acts as a brake and prevents the sudden rising of the magnet. The magnet is held against fluctuation, save when the level of the liquid is raised or lowered, and remains at the higher or lower level. The lower end of the cylinder 23 is preferably closed by a cap 26, upon the exterior of the casing, and the cap may, if desired, carry a pet cock or turning plug 27, to permit the water beneath the piston to escape. If the water in the container remains at substantially a uniform level for a considerable length of time, there is a possibility of sediment collecting about the piston and causing it to adhere to the cylinder, so that in case the liquid level within the container should vary, the magnet would be held against movement and not indicate correctly. By opening the pet cock 27 occasionally and permitting the water beneath the piston to escape, the piston and cylinder are kept free from sediment and prevented from becoming clogged.

The front wall or diaphragm 11 of the container is preferably opaque and of sufficient strength to resist the steam pressure of the boiler. The magnet cannot be seen, but the movement of said magnet is indicated by a pointer 28 carried by a pivot pin 29, extending outwardly from the wall 11 and in direct alinement with the pivot pin 16. The pointer is preferably also a magnet, and the north and south poles of the magnet 17 are opposite to the south and north poles of the pointer, so that the two attract each other and any movement of the magnet 17 results in a corresponding movement of the pointer.

The pointer may be protected in any suitable manner, but preferably the casing carries an annular sheet metal band 30, having an inwardly-directed flange serving to support a dial glass 31, substantially parallel to the wall 11 and forming a compartment or chamber for the pointer.

The dial glass may be held away from the wall 11 and against the flange of the band 30 by a suitable intermediate spacing sleeve 32, also formed of sheet metal. The front surface of the wall 11 may constitute a dial and may be marked in any suitable manner to indicate the deviation of the pointer from its normal position as, for instance, by the letters H, N and L indicating high, normal, and low positions of the pointer and corresponding positions of the water level.

Having thus described my invention, I claim as new and desire to secure by Letters Patent:

1. A water gage, including a casing, a partition for subdividing the casing into two compartments, an inlet and an outlet for one of said compartments, a bar magnet within said last-mentioned compartment and pivoted intermediate its ends to swing vertically, each end of said magnet being extended at an angle to the general direction of the length of the magnet and terminating adjacent said partition, and a pointer within the second of said compartments and pivoted to swing vertically and having enlarged portions disposed adjacent the ends of said magnet but upon the opposite side of said partition.

2. A water gage, including a casing having a back wall and a removable front wall, a magnet within said casing, a bracket secured to the back wall, means for pivotally mounting said magnet intermediate its ends and between said bracket and said back wall, whereby the front wall may be removed independently of the pivoting means, and a pointer pivotally mounted adjacent the outer surface of said front wall and controlled by said magnet.

3. A water gage, including a casing and a magnet within said casing and pivoted intermediate its ends and having each end thereof extending at substantially a right angle to the general direction of the length of the magnet and substantially parallel to the pivot thereof, an annular float mounted on one of said ends, and a weight mounted on the opposite end.

4. A device of the class described, comprising a casing, means for subdividing it into two compartments, an inlet and an outlet for one of said compartments, a bar magnet within said last-mentioned compartment and pivoted intermediate its ends to swing vertically, each end of said magnet being extended at an angle to the general direction of the length of the magnet, a float having an aperture therethrough for receiving one of the end extensions of the magnet, a weight having an aperture therethrough for receiving the other end extension of the magnet, means connected to said magnet for restricting and retarding the movement thereof, and a pointer pivoted in a second compartment but adjacent said magnet.

In testimony whereof I have signed my name to this specification in the presence of two subscribing witnesses.

LADISLAV KAPLAN.

Witnesses:
OTTO J. MULLER,
CLAIR W. FAIRBANK.